US 6,631,096 B2

(12) United States Patent
Gillis et al.

(10) Patent No.: US 6,631,096 B2
(45) Date of Patent: Oct. 7, 2003

(54) METHOD AND APPARATUS FOR DETECTING INTRUSION AND NON-INTRUSION EVENTS

(75) Inventors: Edward J. Gillis, South Lyon, MI (US); Dusan V. Progovac, Grosse Pointe, MI (US); Stephen R. W. Cooper, Fowlerville, MI (US)

(73) Assignee: TRW Inc., Lyndhurst, OH (US)

( * ) Notice: Subject to any disclaimer, the term of this patent is extended or adjusted under 35 U.S.C. 154(b) by 65 days.

(21) Appl. No.: 09/776,276

(22) Filed: Feb. 2, 2001

(65) Prior Publication Data

US 2002/0105417 A1 Aug. 8, 2002

(51) Int. Cl.⁷ .............................................. G01S 15/00
(52) U.S. Cl. ......................................... 367/93; 340/552
(58) Field of Search ..................... 367/93, 94; 340/426, 340/539, 552, 554

(56) References Cited

U.S. PATENT DOCUMENTS

| | | | |
|---|---|---|---|
| 2,071,933 A | 2/1937 | Miessner ..................... 367/93 |
| 3,681,745 A | 8/1972 | Perlman et al. ............... 367/94 |
| 3,725,854 A | 4/1973 | Otsuka ........................ 367/94 |
| 4,012,730 A | 3/1977 | Nicholls .................... 367/94 X |
| 4,580,249 A | 4/1986 | Magee et al. ................. 367/94 |
| 5,077,548 A | 12/1991 | Dipoala ....................... 340/522 |
| 5,475,367 A | * 12/1995 | Prevost ................... 340/552 X |
| 5,640,143 A | 6/1997 | Myron et al. ............... 340/541 |
| 5,856,778 A | 1/1999 | Kani et al. .................. 340/426 |
| 2002/0113696 A1 | * 8/2002 | Nilsson et al. .......... 340/426 X |

* cited by examiner

Primary Examiner—Thomas Mullen
(74) Attorney, Agent, or Firm—Tarolli, Sundheim, Covell & Tummino L.L.P.

(57) ABSTRACT

An intrusion detection system that differentiates between a vehicle intrusion event and a non-intrusion event includes transmitter (16) for transmitting a continuous wave signal that is reflected of surfaces within the vehicle's interior and/or a moving object (i.e., an intruder). The associated reflected signals subsequently return to a receiver (18). An ECU (26) demodulates the return signal into frequency and amplitude components. The ECU (26) further determines a waveform envelope of the demodulated return signals and monitors the envelope waveform during time windows to determine whether their corresponding envelope waveform is indicative of an intrusion event or an non-intrusion event. When an intrusion event is detected, the ECU (26) outputs a control signal to actuate an alarm (34).

18 Claims, 5 Drawing Sheets

METHOD AND APPARATUS FOR DETECTING INTRUSION AND NON-INTRUSION EVENTS

TECHNICAL FIELD

The present invention relates to intrusion detection systems. More particularly, it relates to a system that differentiates between a vehicle intrusion event and a non-intrusion event.

BACKGROUND OF THE INVENTION

Intrusion detection systems are known for protection of vehicles and their contents from theft. If an intrusion is detected, known systems sound the vehicle's horn, flash the vehicle's lights, and/or disable the vehicle's ignition system to render the vehicle inoperative.

Intrusion detection systems utilizing ultrasonic signals and the Doppler principle are also known. Such devices detect a change in the received frequency from the transmitted signal frequency, the difference frequency being a Doppler frequency resulting from a Doppler shift due to movement within a monitored area. The received signal is a sinusoidal waveform having a frequency dependent upon the rate of change in position of an object within the protected area. When there is no motion within the protected area, the frequency of the return signal is equal to the ultrasonic frequency of the transmitted signal, i.e., there is no Doppler shift when there is no object movement.

Intrusion detection systems using ultrasonic signals, however, are prone to false alarms. Ideally, the system should not detect non-intrusive events that may occur relative to the vehicle. An inadvertent striking of the outside of one of the vehicle's windows, motion near or around the vehicle, or air turbulence within the occupant seating area are non-intrusive events that should not trigger the vehicle's intrusion detection system. Nevertheless, these non-intrusive events alter the signal received by an ultrasonic intrusion detection systems by modulating or adding noise to the reverberation field generated by the transmitter and received by the receiver, i.e., the non-intrusive event may be interpreted as being an intrusive event which, in turn, results in a false alarm.

It is known in intrusion detection ultrasonic-based systems to decrease the system's sensitivity to reduce the possibility of a false alarm. The detection thresholds may be raised to decrease the system's sensitivity to non-intrusive events which will reduce the occurrence of false alarms, but generally at the expense of reduced intrusion detection capability. Further, temperature changes in the vehicle's interior can disturb the amplitude and/or phase of the return signal received by the intrusion detection system. Thus, it is desirable for the intrusion detection system to not interpret a temperature disturbance as an intrusion event.

One particular type of known intrusion detection system generates a reverberation field within a protected space. The reverberation field includes a plurality of signals traveling along a plurality of propagation paths within the protected space. The system detects a change in the characteristic of the reverberation field upon the changing of a physical characteristic of an object within the protected space. For instance, the entry of a new object into the field or a change in position of motion of an existing object in the field. An alarm signal is only generated when the change in the reverberation field is greater than a predetermined threshold value.

Another type of known intrusion detection system detects intrusion into a vehicle interior by passing an airborne acoustic signal through a portion of the vehicle interior when the vehicle security system is active. The system measures any change in phase in the signal as it passes through the vehicle. The phase of a first frequency component in the signal is sensitive to intrusion into the vehicle. The phase of a second frequency component is sensitive to false alarm conditions, and is not sensitive to intrusion.

SUMMARY OF THE INVENTION

In accordance with the present invention, an apparatus and method are provided for detecting intrusion or non-intrusion events within limits of a predetermined area. In accordance with one aspect, the intrusion/non-intrusion detection system transmits and receives continuous wave signals within the limits of the predetermined area. The system includes signal processing means for generating envelope waveforms from the returns of the continuous wave signal. Further, the system includes a controller that divides the envelope waveforms into windows and compares the envelope waveforms with predetermined thresholds to determine the occurrence of an intrusion or non-intrusion event. For instance, the entry of a new object into the field or a change in position of motion of an existing object in the field.

In accordance with one aspect of the present invention, an apparatus includes a transmitter transmitting a continuous wave signal within the predetermined area, a receiver receiving reflected return signals from the continuous wave signal, a demodulator demodulating the return signals, monitor monitoring envelopes of the demodulated return signals during time windows, and a discriminator discriminating between an intrusion and a non-intrusion event in response to the monitored envelopes during the time windows.

In accordance with another aspect of the present invention, a method for detecting intrusion within limits of a predetermined area includes the steps of transmitting a continuous wave signal within the predetermined area, receiving returns of the continuous wave signal bounced within the limits of the predetermined area, demodulating the return signal, monitoring envelopes of the demodulated return signals during time windows, and discriminating between an intrusion and a non-intrusion event in response to the monitored envelopes during the time windows.

BRIEF DESCRIPTION OF THE DRAWINGS

Further features and advantages of the present invention will become apparent to those skilled in the art from reading the following detailed description with reference to the accompanying drawings, in which.

DESCRIPTION OF PREFERRED EMBODIMENT

Figure 1:
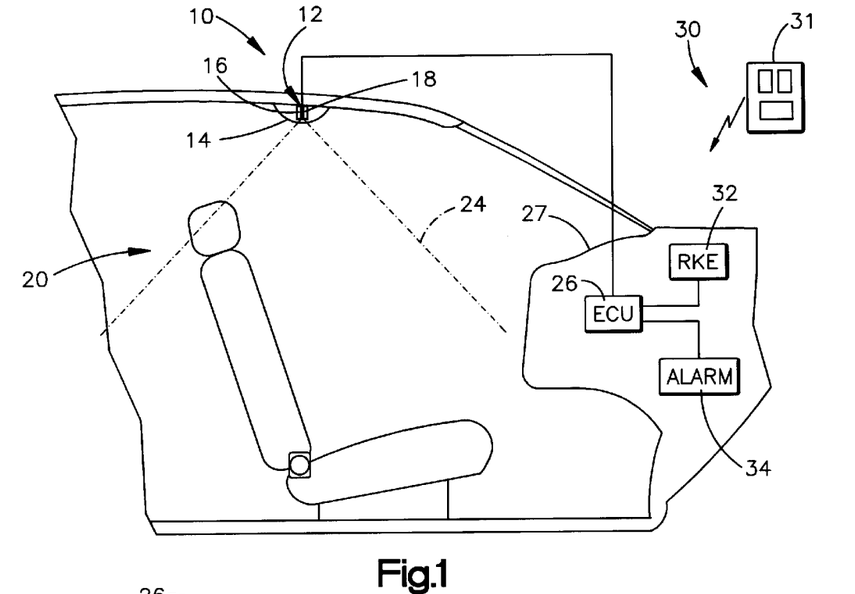
FIG. 1 is a schematic diagram of an intrusion detecting apparatus, in accordance with the present invention.
Figure 2:
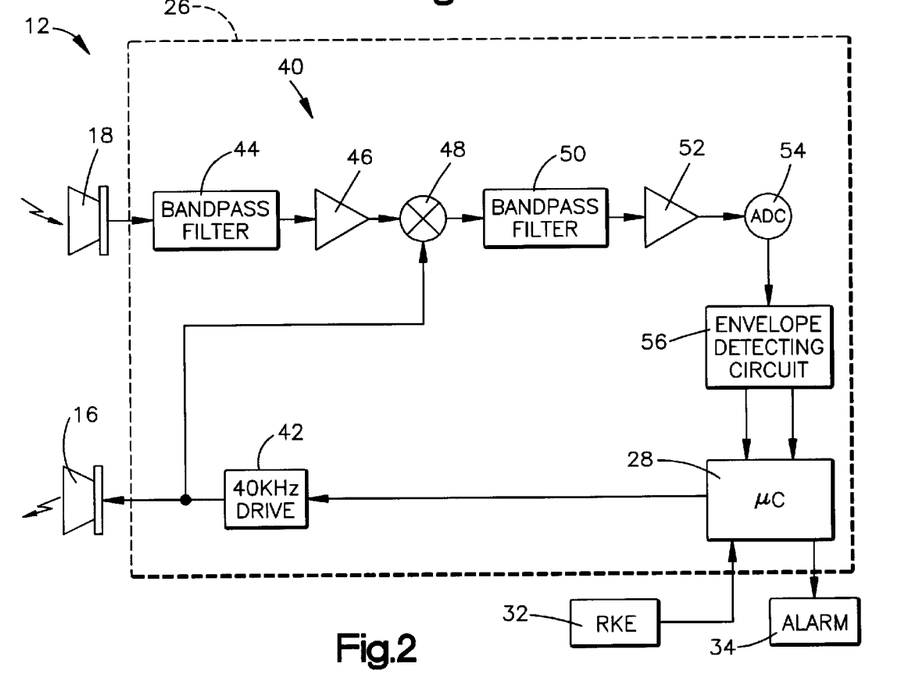
FIG. 2 is a schematic block diagram of the apparatus of FIG. 1.

Referring to FIGS. 1 and 2, an exemplary embodiment of an intrusion detection system 10, in accordance with the present invention, is shown. A continuous wave ultrasound signal is transmitted into the vehicle's interior 20 and reflected off objects within the interior. A return signal has changes in frequency, amplitude, and phase dependent upon motion of an object within the vehicle's interior. These changes result in a modulation of the reverberation field created by the transmitted and reflected signals.

The system 10 includes a transceiver 12 mounted in the overhead console 14. Preferably, the transceiver 12 is an ultrasound device that transmits and receives ultrasound signals. In accordance with one exemplary embodiment of the present invention, the transmitted wave is a continuous wave. The transceiver 12 includes a transmitter 16 and a receiver 18 which are arranged closely to each other. It is to be appreciated that the transceiver 12 may be mounted at some other location within the vehicle passenger compartment 20, such as on a headliner, between front seats of the vehicle or on a central portion of an upper edge of a front windshield. A suitable location is one that allows a beam 24 from the transmitter 16 to cover a significant portion of the vehicle interior 20.

It is further to be appreciated that more than one transceiver 12 may be used as an alternative. Also, a person of ordinary skill in the art will appreciate that a different type of transceiver 12 may be used, such as an infrared device.

The operating frequency of the transceiver 12 is predetermined. In an exemplary embodiment, the transceiver 12 is a NICERA piezo transducer AT/R40-10 with operating frequency at 40 kHz. The operating frequency of the transceiver 12 is preferably greater than the human listening range (i.e., greater than 20 kHz).

An electronic control unit ("ECU") 26 is operatively connected to the transceiver 12 and may be located within the vehicle's dashboard 27. In an exemplary embodiment, the ECU 26 comprises a plurality of discrete circuits, circuit components, and a controller 28. A person of ordinary skill in the art will appreciate that the ECU 26 can take several forms including a combination digital or analog circuits or packaged as an application specific integrated circuit (ASIC). The ECU 26 controls the transceiver 12 to emit a continuous wave signal and monitors the transceiver 12 for the reception of return signals. Particularly, the ECU 26 discriminates between an intrusion event and a non-intrusion event, in accordance with the present invention, in response to the received return signal.

A remote convenience vehicle system 30 is provided that permits vehicle remote locking and unlocking functions. The system is commonly referred to as a remote keyless entry ("RKE") system. The RKE system 30 includes a remote transmitter 31 and an on-board receiver 32. The receiver 32 is operatively connected to the ECU 26. The RKE system 30 allows the vehicle operator to disable the intrusion detection system 10 before entering the vehicle and enables the intrusion detection system 10 once the locking system is enabled. The enabling and disabling of the intrusion detection system 10 is preferably automatic with the locking and unlocking, respectively, of the vehicle. Such remote convenience vehicle systems may also provide for control of other vehicle functions, such as, a remote engine start function, a remote door open function, and a vehicle locator function. An alarm 34 is operatively connected to and is controlled by the ECU 26 to sound an alarm when an unauthorized intrusion is detected by the intrusion detection system 10.

When the intrusion detection system 10 is armed by the RKE system 30, i.e., the vehicle is locked using the RKE system, the transceiver 12 is enabled to transmit and receive ultrasound signals. In accordance with one embodiment, continuous wave ("CW") signals are transmitted as the beam 24. The ultrasound signals bounce off interior structures and bounce throughout the vehicle's interior. Portions of the bounced signals return to the receiver 18. As a result, the receiver 18 "sees" a single wave that is a superposition of all the return signals from all the surfaces within the vehicle. The sum of all the return signals results in a single wave at receiver 18 that has the same frequency as the transmitted signal, but has a phase and amplitude dependent on the way all the phases and amplitudes of the various return signals add together at the receiver 18.

Although the specific frequency, amplitude, and phase of the return signals at the receiver 18 cannot be predicted, the frequency, amplitude, and phase can be expected to remain constant over time if nothing within the vehicle moves and the temperature remains substantially constant. However, if physical motion of an object is introduced within the vehicle interior, then this motion creates a disturbance in the overall reflection pattern sum present at the receiver 18. Physical motion of an object within the vehicle's interior results in a Doppler shift in the frequency of the ultrasound wave which results in a modulation of frequency, amplitude, and phase of the standing wave return signal. The changes can be monitored at the receiver 18.

In operation, the CW signals emitted from the transmitter 16 bounce on different surfaces within the vehicle's interior and any objects, stationary or moving (i.e., an intruder), within the vehicle's interior and associated reflected signals returned to the transceiver 12. The ECU 26 processes the return signals to determine waveform envelopes of the reverberation field modulations. The ECU 26 then determines whether determined waveform envelopes are indicative of an intrusion event or a non-intrusion event. The ECU 26 is connected to and controls the alarm system 34. Only upon the determination of an intrusion event, the ECU 26 enables the alarm system 34. In addition to actuating an alarm 34, other vehicle security measures could be actuated in response to an intrusion including disabling of the ignition system, etc.

FIG. 2 is a functional block diagram of the ECU 26 including processing circuitry 40, an envelope detection signal processing means 56, and a controller 28 such as a microcomputer. An oscillating drive circuit 42 generates a CW signal at a frequency of 40 kHz that is applied to the transmitter 16 of the transceiver 12. This CW signal can be either a square wave or a sinusoidal waveform.

Specifically, the oscillating circuit 42 generates a 40 kHz signal that drives the transmitter 16 and results in the transmitter 16 producing a continuous wave ultrasound signal at 40 kHz to fill the interior 20 of the vehicle. The ultrasonic waves emitted by the transmitter 16 bounce off objects throughout the vehicle's interior and establish a reverberation field. The receiver 18 receives the return signals and outputs a signal to a bandpass filter 44 indicative of the returned waves summed at the receiver location. The bandpass filter 44 minimizes noise not associated with the intrusion effects to be detected by the system and prevents the output signal from receiver 18 from overloading a pre-amplifier 46. The bandpass filter 44 passes a filtered signal to the pre-amplifier 46, which in turn, passes an amplified return signal to a synchronous demodulator 48. The output of the drive circuit 42 is also connected to the demodulator 48.

The demodulator 48 synchronously demodulates the output of the pre-amplifier 46 with the drive CW signal from the oscillating circuit 42. This CW drive signal from driver 42 is used as the demodulation reference. The demodulator 48 extracts frequency (Doppler effect) and amplitude components of the modulated signal which would be the result of motion of an object, e.g., an intruder, through the reverberant ultrasound field established within the vehicle interior 20 by the transmitted and reflected ultrasound signals. The output of the demodulator 48 is proportional to both the frequency and amplitude of the return signal.

A demodulated output signal passes to a second bandpass filter 50, which removes the DC background from the demodulated output signal. In an exemplary embodiment, the lower limit of the second bandpass filter 50 is as low as below 1 Hz and is typically from several Hertz to several tenths of a Hertz (depending on how slow intrusion we want to detect and how much of noise we need to handle) less than 1 Hz and the upper limit is selected to be greater than the expected frequency that would result during an intrusion event. The upper limit must be low enough, however, to provide some noise rejection and anti-aliasing of an analog-to-digital converter 54 ("ADC") used to further process the demodulated signal. In embodiments with relatively high sampling rates, the upper limit of the bandpass filter 50 can be increased, accordingly.

The output from the bandpass filter 50 is passed to a post-amplifier 52, which in turn passes the signal to the ADC 54. In an exemplary embodiment, the ADC 54 samples at 1 kHz which results in a requirement for the upper limit of the second bandpass filter 50 to be at or below 500 Hz. The ADC 54 passes the digitized value of the demodulated return signal to the envelope detecting circuit 56. Please note that block 56 could be also implemented in digital form as an algorithm running on a micro controller. The envelope detecting circuit 56 determines envelope waveforms of the demodulated return signal. In an alternative embodiment, the function of the envelope detecting circuit 56 could be performed in hardware outside the controller 28, but in that case block 54 would not be used.

Figure 3:
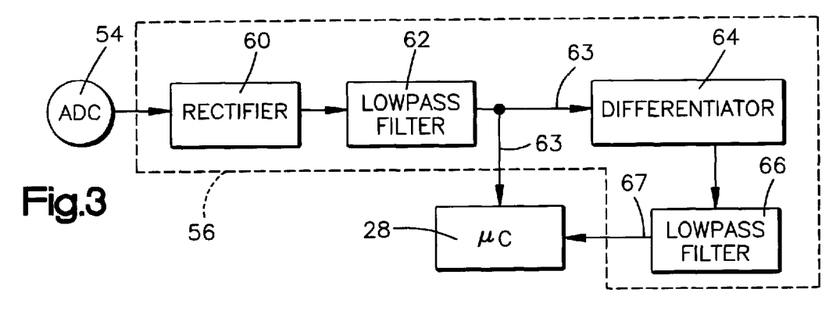
FIG. 3 is a schematic diagram of an envelope detection circuit for the system of FIGS. 1 and 2.

Referring to FIG. 3, the envelope detecting circuit 56 includes a rectifier 60 for digitally rectifying the demodulated return signal and passes the rectified signal to a low-pass filter 62. There are different types of low-pass filters available and many types may be used. For instance, one type of low-pass filter is a recursive filter that achieves a long impulse response, without having to perform a long convolution. The recursive filter removes noise jitters or spikes from the rectified signal from rectifier 60.

The low-pass filter 62 of the envelope detecting circuit 56 passes a filtered signal 63 to a combination of a differentiator 64 and a low-pass filter 66 to generate a filtered derivative value 67 of the rectified return signal. The envelope detecting circuit 56 provides the two signals 63, 67 to be further processed by the controller 28, i.e., the rectified return signal 63 and the derivative of the rectified return signal 67.

Figure 4:
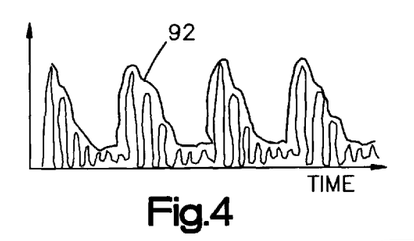
FIG. 4 illustrates a non-intrusion envelope.

Referring to FIG. 4, a time representation of the values of a rectified return signal is shown for a non-intrusive event (e.g., four thumps on the outside of the vehicle's window). The resultant determined envelope signal 92 for this non-intrusive event is also shown. The non-intrusive event results in an envelope signal that is a harmonic signal with a rapid rise time followed by a slower decay time. Normally, a non-intrusive contact, such as tapping on a window, does not occur regularly so as to generate a continuous waveform. A non-intrusion event (such as a window thump) results in a rise and decay of the envelope signal 92 within 250 ms. In effect, such non-intrusive events affect the return signal for a duration less than 250 msec.

Figure 5:
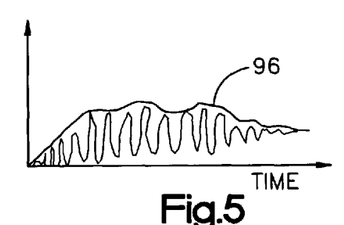
FIG. 5 illustrates an intrusion envelope.

Referring to FIG. 5, a time representation of the values of a rectified return signal is shown for an intrusion event. The resultant determined envelope signal 96 for this intrusive event is a harmonic signal with a slow rise time. As long as motion continues during the intrusion, the resultant envelope is a continuous waveform with an amplitude greater than a predetermined value over a time period of substantially greater than 250 msec. Therefore, an envelope with high amplitude with short duration is indicative of a non-intrusion event. An envelope of a predetermined amplitude with a long duration is indicative of an intrusion event.

Figure 6:
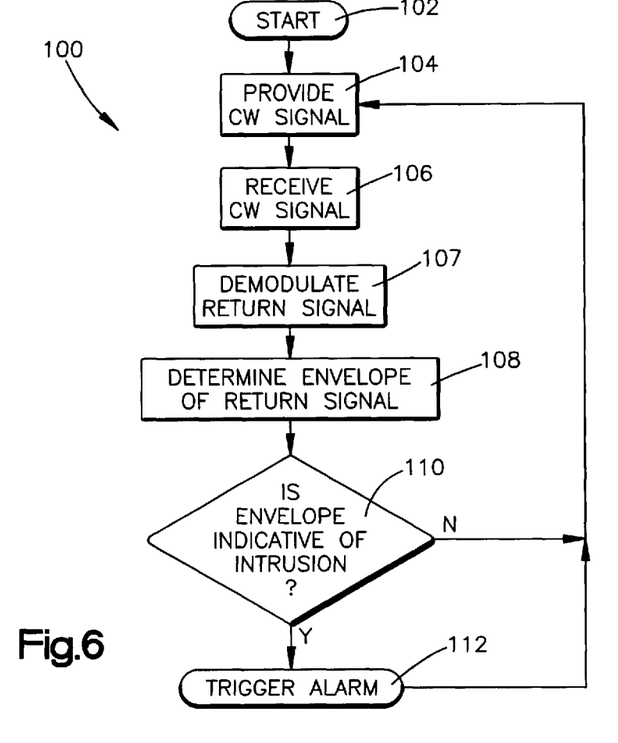
FIG. 6 is a flowchart diagram showing a control process in accordance with the present invention.

Referring to FIG. 6, a control process, in accordance with the present invention, determines the existence of an intrusion event or a non-intrusion event. Process 100 begins at step 102 where memories are cleared, initial flag conditions are set, etc., as is well known in the art. The process then proceeds to step 104 where a continuous wave signal is transmitted by transmitter 16 within a predetermined area, i.e., the vehicle's interior. From step 104, the process proceeds to step 106. At step 106, the continuous wave signal bounced within the limits of the vehicle's interior is received at the receiver 18. The process next proceeds to step 107.

At step 107, the return signal is demodulated. In step 108, the envelope of the demodulated return signal is determined. From step 108, the process proceeds to step 110.

At step 110, a determination is made as to whether the determined envelope of the demodulated return signal is indicative of an intrusion event or a non-intrusion event. If the determination is affirmative, the process proceeds to step 112 where an alarm is triggered. The process then loops back to step 104. If the determination in step 110 is negative, i.e., the envelope is indicative of a non-intrusion event, the process loops back to step 104.

Figure 7A:
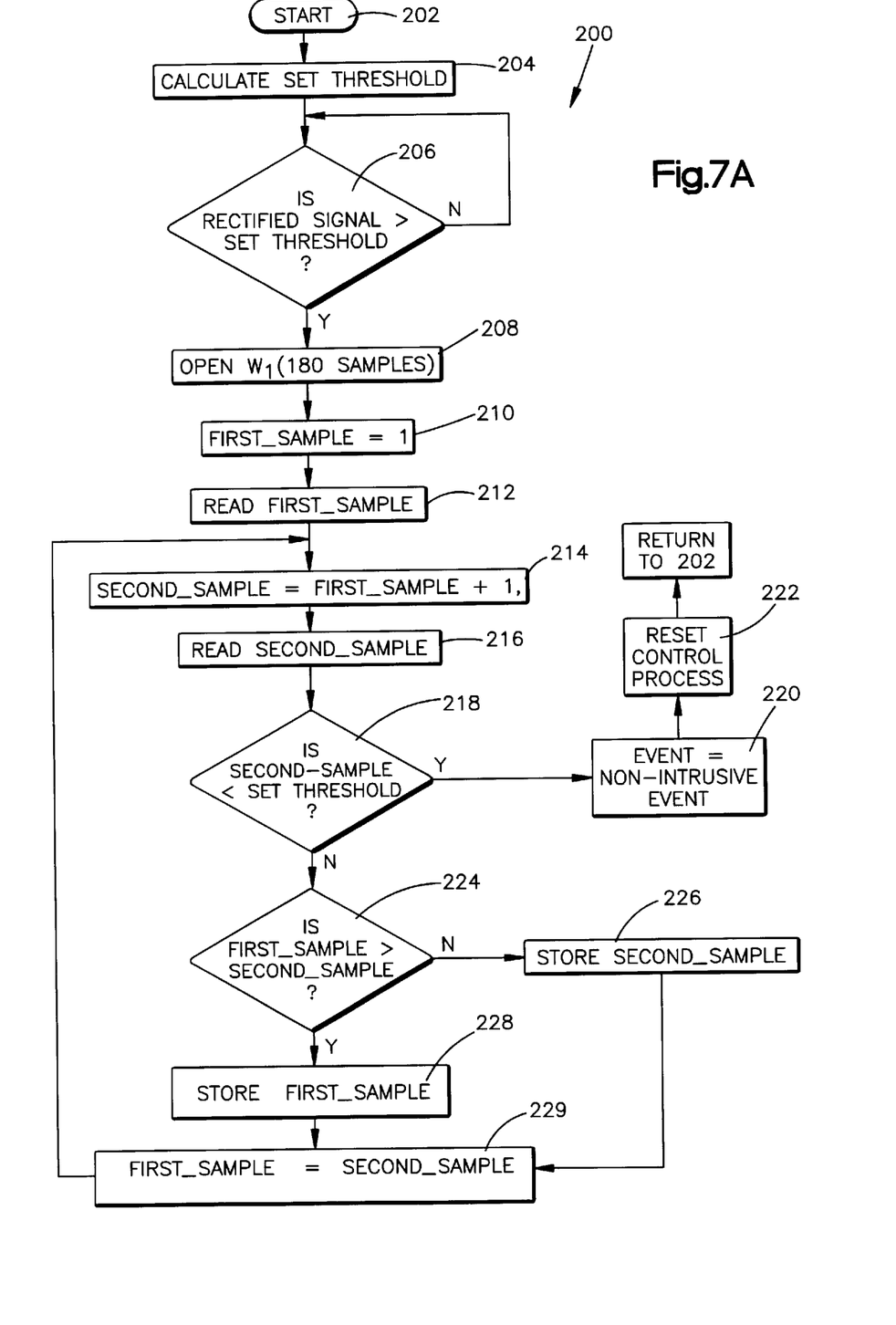
FIGS. 7A, 7B are flowchart diagrams of the control process in accordance with the present invention during a first sampled window.

An exemplary embodiment of a control process performed by the controller 28, in accordance with the present invention, to accomplish the step 110 determination of FIG. 6, is shown in FIG. 7A. This control process monitors the determined envelope by dividing the signal into time windows. Each window comprises a predetermined number of time sampled values which are analyzed and compared against predetermined thresholds. Because a signal from a non-intrusion event ("a non-intrusion signal") has a rapid rise time compared to a signal from an intrusion event ("an intrusion signal"), the first window is primarily used to determine the presence of a false alarm or a non-intrusion event. An intrusion event is not determined, in accordance with the present invention, until a second time window is open.

From empirical data, it has been determined that a non-intrusion signal envelope takes between 100 to 200 msec. to reach a peak value and 100 to 150 msec. to decay below a predetermined threshold value. It has also been determined that an intrusion signal envelope will last well over a 300 msec. period. As a result, for illustrative purposes, the first time window is set to be equal to 180 msec. and the second time window is set to equal to 120 msec.

The control process begins at step 202 where internal memories of the controller 28 are reset, flags are set to initial conditions, etc. as is well known in the art. At step 204, a set threshold is calculated. The set threshold is computed by calculating the running average of the rectified return signal 63 and adding to that a RMS ("root-mean-square") value of the rectified return signal 63 multiplied times four. The duration of the running average and the number of RMS values added to the average of the rectified return signal 63 varies from application to application and is determined through empirical testing and analysis for each vehicle platform of interest.

At step 206, the level of the envelope of the rectified return signal 63 is repeatedly evaluated at a predetermined rate. The values are sequentially processed. The envelope of the rectified return signal 63 is compared against the calculated set threshold from step 204 and a determination is made as to whether the envelope value of the signal exceeds the set threshold from step 204. If the value of the rectified return signal 63 exceeds the set threshold and if the low-pass filtered derivative signal 67 exceeds a predetermined positive threshold, the process proceeds to step 208. If the determination is negative, the process loops back onto itself until an affirmative determination occurs. At step 208, a first time window, $W_1$, is opened (i.e., a first time period begins to run). In accordance with one embodiment, the window $W_1$ is open for a time sufficient to permit a maximum of 180 samples of the envelope waveform. From step 208, the process proceeds to step 210.

At step 210, a FIRST_SAMPLE pointer is initialized to equal a time position for the first sample of the rectified return signal 63 during the window $W_1$. From step 210, the process proceeds to step 212. At step 212, the process 200 reads a FIRST_SAMPLE, $X_{FIRST\_SAMPLE}$ of the rectified return signal 63. At step 214, a SECOND_SAMPLE pointer is initialized to equal the time position for the second sample of the rectified return signal 63 during the window $W_1$. In an exemplary embodiment, what is referred to as the SECOND_SAMPLE pointer value ranges from 2 to 180, i.e., the time window $W_1$ is divided into 180 time positions. At step 216, the process 200 reads a second sample, $X_{SECOND\_SAMPLE}$, of the rectified return signal 63 at the next pointer (time position). From step 216, the process proceeds to step 218.

At step 218, a determination is made as to whether the second sample read is less than the calculated set threshold (step 204). If the determination is affirmative, the process proceeds to step 220 where the EVENT status is set equal to a non-intrusive event and proceeds to step 222. At step 222, the control process resets. From step 222, the subroutine process ends and returns to step 202. A new set threshold is calculated, and the process proceeds as described above. If the determination is negative, from step 218, the process proceeds to step 224.

At step 224, a determination is made as to whether the amplitude of the FIRST_SAMPLE is greater than the amplitude of the SECOND_SAMPLE. If $X_{FIRST\_SAMPLE}$ is less than or equal to $X_{SECOND\_SAMPLE}$, i.e., the determination is negative meaning that the envelope value is increasing (a positive slope), the process proceeds to step 226. At step 226, the process $X_{SECOND\_SAMPLE}$ value is stored. If $X_{FIRST\_SAMPLE}$ is greater than $X_{SECOND\_SAMPLE}$, meaning that the envelope value is decreasing in value (a negative slope), the process proceeds to step 228. At step 228, the process stores $X_{FIRST\_SAMPLE}$ value. From step 228 or step 226, the process proceeds to step 229.

At step 229, $X_{FIRST\_SAMPLE}$ value is set to equal to $X_{SECOND\_SAMPLE}$ value and the process loops back to step 214. At step 214, the position pointer of the second sample is moved to the next pointer position (time location) during the window $W_1$. At step 216, the process reads a new SECOND_SAMPLE value, $X_{SECOND\_SAMPLE}$. As a result, the process 200 successively compares throughout the first window $W_1$ the amplitude of one sample point within the window with the amplitude of a subsequent sample point within the window, monitors, and stores the largest sample value.

Figure 7B:
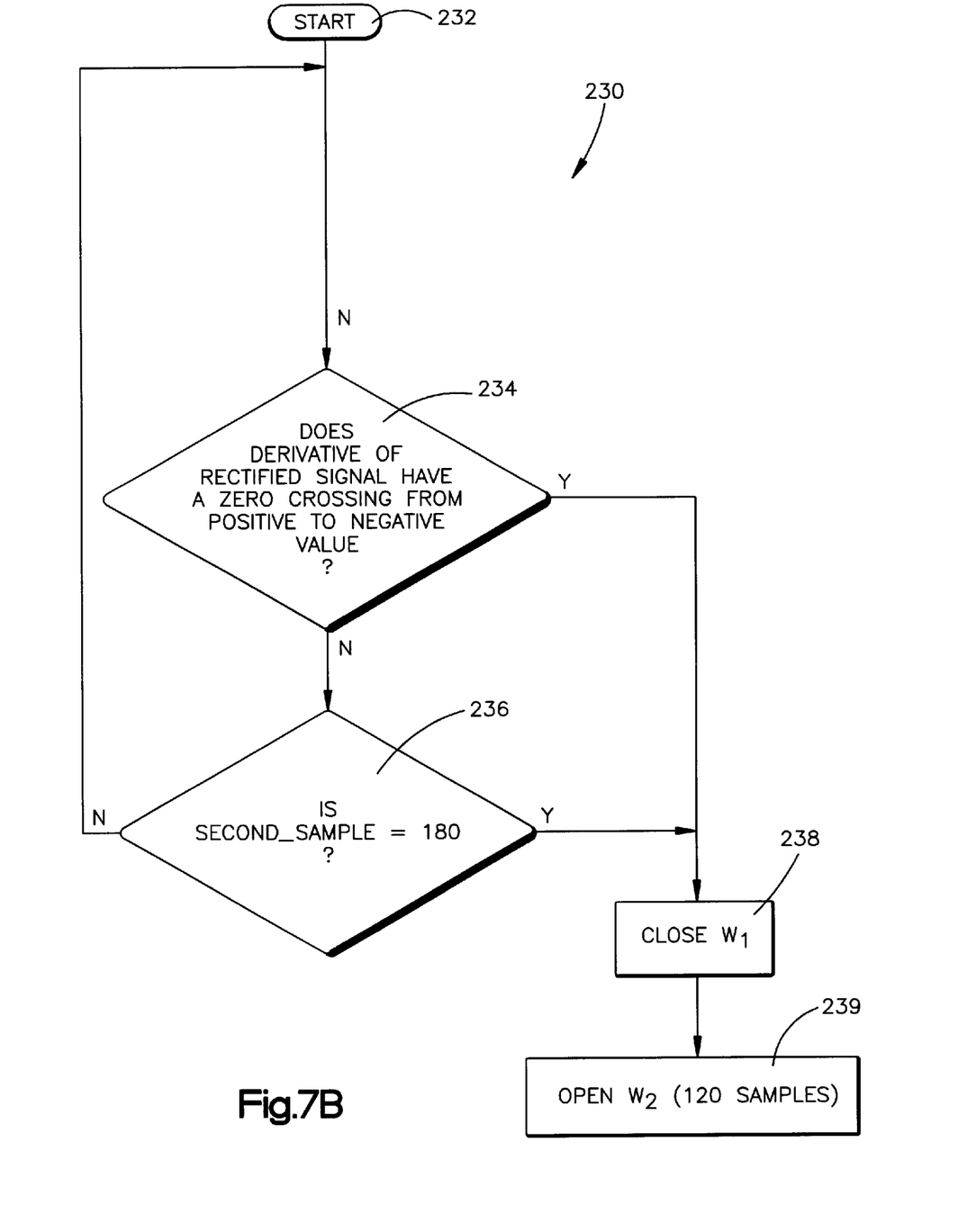

Once the process 200 stores either a first or second sample, the process starts a subroutine control process 230 (FIG. 7B) to determine whether a window $W_1$ should close and a second time window, $W_2$, should open. One embodiment of this subroutine control process performed by the controller 28, in accordance with the present invention, is shown in FIG. 7B. Process 230 is initiated at step 232 and proceeds to step 234.

At step 234, a determination is made as to whether the derivative of the rectified return signal 67 has a zero crossing from positive to negative. If the derivative of the rectified return signal 67 does not have a zero crossing, process 230 proceeds to step 236. At step 236, if the total number of samples within $W_1$ does not equal the maximum number of time samples within $W_1$ (i.e., 180), process 230 loops back to step 234.

If the determination in step 234 is affirmative, i.e., the derivative of the rectified return signal 67 does have a zero crossing or, the determination in step 236 is affirmative, i.e., the total number of samples within $W_1$ equals 180, then process 230 proceeds to step 238. At step 238, $W_1$ closes and, at step 239, the second time window, $W_2$, opens. In an exemplary embodiment, the time period of $W_2$ is set to equal to 120 ms. It should be appreciated that the time window $W_1$ is open for 180 time samples or until the determination in step 234 is affirmative.

Figure 8:
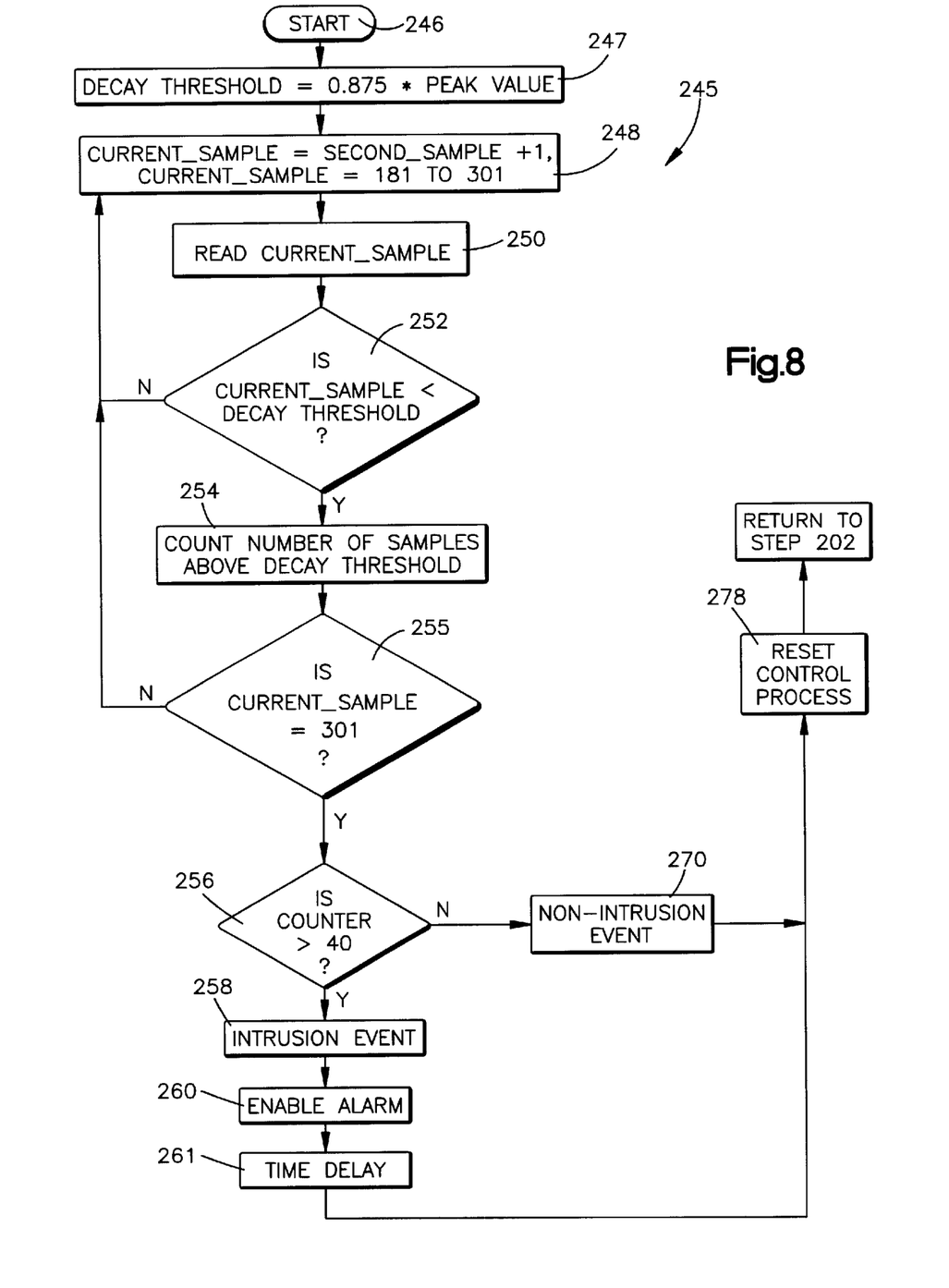
FIG. 8 is flowchart diagram of the control process in accordance with the present invention during a second sampled window.

The algorithm implemented to evaluate the second time window, $W_2$, is shown in FIG. 8. The process 245 is initiated at step 246 and proceeds to step 247. At step 247, a decay threshold is calculated. In accordance with an exemplary embodiment, the decay threshold is equal to 0.875 times the maximum peak value monitored and stored during the process shown in FIGS. 7A and 7B for the first window, $W_1$. From step 247, the process proceeds to step 248. A current sample value is the point in time within the envelope of the rectified return signal 63 when $W_1$ just closes and $W_2$ just opens. As a result, the current sample indicator is set equal to the point in time where $W_1$ closes and increments it by one. If $W_1$ stayed open for the full 180 time samples, the pointer would then be at 181. If $W_1$ closed before reaching a pointer value of 180, the pointer value would be equal to the last pointer value plus 1. From step 248, the process proceeds to step 250.

At step 250, the first sample within $W_2$ is read i.e., the envelope value is measured. From step 250, the process proceeds to step 252 where a determination is made as to whether the first sample or current sample within $W_2$ is less than the decay threshold value. If the determination is negative the process loops back to step 248. If the determination is affirmative, i.e., the current sample is below the decay threshold, the process proceeds to step 254. At step 254, the number of samples in the envelope of the rectified return signal 63 that are above the decay threshold are counted. From step 254, the process proceeds to step 255.

At step 255, a determination is made as to whether the current sample is at 301. If the determination at step 255 is negative, the process 245 loops to step 248. If the determination at step 255 is affirmative, the process 245 goes to step 256.

At step 256, a determination is made as to whether the number of samples within the second time window below the decay threshold (the count of step 254) exceeds a predetermined number. For illustrative purposes, the preset number is equal to 40 samples. If the number of samples within the second window does exceed 40 samples, then the process proceeds to step 258 where an intrusion event flag is set and an alarm is enabled in step 260. From step 260, the process proceeds to step 261, where a time delay occurs.

From a negative determination in step 256, the process proceeds to step 270 where a non-intrusion event flag is set. From step 261 or step 270, the process 245 goes to step 278. The control process is reset in step 278. Specifically, the process resets the control process at 278 and loops back to step 202 in process 200 of FIG. 7A.

Although the foregoing has been applied to a vehicle intrusion detection system 10, various modifications and changes thereto can be made by persons skilled in the art to apply the foregoing to intrusion detection system to any enclosed space such as secured rooms or safes where false alarms induced by bumping sounds from adjacent surfaces (e.g., walls and windows) would not be desirable.

From the above description of the invention, those skilled in the art will perceive improvements, changes and modifications. Such improvements, changes and modifications within the skill of the art are intended to be covered by the appended claims.

Having described the invention, the following is claimed:

1. An apparatus for detecting an intrusion event within limits of a predetermined area, said apparatus comprising:
    a transmitter transmitting a continuous wave signal within the predetermined area;
    a receiver receiving reflected return signals from the continuous wave signal;
    a demodulator demodulating the return signals;
    a monitor monitoring envelopes of the demodulated return signals during time windows; and
    a discriminator discriminating between an intrusion and a non-intrusion event in response to the monitored envelopes during the time windows, said discriminator determining a non-intrusion event in response to a predetermined increase and decrease of one of the monitored envelopes during the time windows and determining an intrusion event in response to a predetermined increase of one of the monitored envelopes during the time windows.

2. An apparatus for detecting an intrusion event within limits of a predetermined area, said apparatus comprising:
    a transmitter transmitting a continuous wave signal within the predetermined area;
    a receiver receiving reflected return signals from the continuous wave signal;
    a demodulator demodulating the return signals;
    a monitor monitoring waveform envelopes of the demodulated return signals at a sample rate;
    a discriminator discriminating between an intrusion and a non-intrusion event in response to the monitored waveform envelopes, said discriminator including:
        (a) first determining means for determining a non-intrusion event when the value of the waveform envelope during a first predetermined time window is less than a first predetermined threshold,
        (b) second determining means for determining an intrusion event when a predetermined number of samples of the waveform envelope during a second predetermined time window is greater than a second predetermined threshold, and
        (c) third determining means for determining a non-intrusion event when said predetermined number of samples of the waveform envelope during said second predetermined time window is less than said second predetermined threshold.

3. The apparatus as set forth in claim 2, wherein said monitor includes means for rectifying said return signal and determining a derivative of the rectified return signal.

4. The apparatus as set forth in claim 3, wherein said discriminator includes closing means for closing said first time window in response to at least one of:
    (a) the derivative of the rectified return signal has a zero crossing from positive to negative, and
    (b) the number of samples within said first time window has reached a preset value.

5. The apparatus as set forth in claim 3, wherein said discriminator includes timing means for opening said second predetermined time window in response to at least one of:
    (a) a predetermined number of samples of the rectified return signal being greater than said second predetermined threshold and outputting a signal indicative of an intrusion event, and
    (b) a predetermined number of samples of the rectified return signal is less than said second predetermined threshold and outputting a signal indicative of a non-intrusion event.

6. An apparatus for detecting intrusion within limits of a predetermined area, said apparatus comprising:
    transmitting means for transmitting a continuous wave signal within the predetermined area;
    receiving means for receiving returns of the continuous wave signal reflected within the limits of the predetermined area;
    return signal outputting means operatively connected to said transmitting and receiving means for outputting a demodulated return signal in response to the transmission of said continuous wave signal and the return of said continuous wave signal;
    monitoring means for monitoring envelopes of the demodulated return signal at a sample rate, said monitoring means includes means for rectifying said return signal and determining a derivative of the rectified return signal; and
    discriminating means for discriminating between an intrusion and a non-intrusion event, said discriminating means including
        (1) determining means for determining whether the envelope of the rectified return signal exceeds a set threshold,
        (2) first timing means for opening a first time window for performing said monitoring of samples of said envelope, said discriminating means determining whether the non-intrusion event occurred during said first time window and outputting a signal indicative thereof,
        (3) closing means for closing said first time window in response to at least one of:
            (a) the derivative of the rectified return signal has a zero crossing from positive to negative, and
            (b) the number of samples within said first time window has reached a preset value,
        (4) second timing means for opening a second time window for further performing said monitoring of samples of said envelope, said discriminating means determining at least one of:
            (a) a predetermined number of samples of the rectified return signal is greater than a decay threshold and outputting a signal indicative of an intrusion event, and
            (b) a predetermined number of samples of the rectified return signal is less than the decay threshold and outputting a signal indicative of a non-intrusion event.

7. The apparatus as set forth in claim 6, further including enabling means for enabling an alarm in response to a determined intrusion event.

8. The apparatus as set forth in claim 6, further including resetting means for resetting said discriminating means when an intrusion event is determined and at least one of:
 (1) the determination of an intrusion event has occurred for a predetermined time period, and
 (2) the value of the rectified return signal is less than a predetermined value.

9. The apparatus as set forth in claim 6, further including resetting means for resetting said discriminating means when a non-intrusion event is determined and at least one of:
 (1) the rectified return signal is less than the set threshold,
 (2) a current sample of the rectified return signal is equal to a preceding sample of the rectified return signal,
 (3) a preset time has expired from the time a non-intrusion event is determined,
 (4) a preset time has expired from the opening of the second time window, and
 (5) the derivative of the rectified output signal is greater than the slope of the derivative of the rectified return output signal.

10. A method for detecting intrusion within limits of a predetermined area, said method comprising the steps of:
 transmitting a continuous wave signal within the predetermined area;
 receiving returns of the continuous wave signal bounced within the limits of the predetermined area;
 demodulating the return signal;
 monitoring envelopes of the demodulated return signals during time windows; and
 discriminating between an intrusion and a non-intrusion event in response to the monitored envelopes during the time windows, including determining a non-intrusion event in response to a predetermined increase and decrease of one of the monitored envelopes during the time windows and determining an intrusion event in response to a predetermined increase of one of the monitored envelopes during the time windows.

11. A method for detecting intrusion within limits of a predetermined area, said method comprising the steps of:
 transmitting a continuous wave signal within the predetermined area;
 receiving returns of the continuous wave signal reflected within the limits of the predetermined area;
 demodulating the return signal;
 monitoring envelopes of the demodulated return signal at a sample rate; and
 discriminating between an intrusion and a non-intrusion event including,
 (a) determining a non-intrusion event when the value of the waveform envelope during a first predetermined time window is less than a first predetermined threshold,
 (b) determining an intrusion event when a predetermined number of samples of the waveform envelope during a second predetermined time window is greater than a second predetermined threshold, and
 (c) determining a non-intrusion event when said predetermined number of samples of the waveform envelope during said second predetermined time window is less than said second predetermined threshold.

12. The method as set forth in claim 11, wherein said step of monitoring further includes the steps of rectifying the return signal and differentiating the rectified return signal.

13. The method as set forth in claim 12, wherein said discriminating step further includes the step of closing said first time window when the derivative of the rectified return signal has a zero crossing from positive to negative and when the number of samples within said first time window has reached a preset value.

14. The method as set forth in claim 12, wherein said step of opening said second time window further includes the step of determining at least one of a predetermined number of samples of the rectified return signal is greater than said threshold, and outputting a signal indicative of an intrusion event, and a predetermined number of samples of the rectified return signal is less than said threshold, and outputting a signal indicative of a non-intrusion event.

15. A method for detecting intrusion within limits of a predetermined area, said method comprising the steps of:
 transmitting a continuous wave signal within the predetermined area;
 receiving returns of the continuous wave signal reflected within the limits of the predetermined area;
 outputting a demodulated return signal in response to the transmission of said continuous wave signal and the return of said continuous wave signal;
 monitoring envelopes of the demodulated return signal at a sample rate, said monitoring step including rectifying the return signal and differentiating the rectified return signal; and
 discriminating between an intrusion and a non-intrusion event, including,
 (1) determining whether the envelope of the rectified signal exceeds a set threshold,
 (2) opening a first time window for monitoring of samples of said envelope, said discriminating step determining whether the non-intrusion event occurred during said first time window,
 (3) closing said first time window when the derivative of the rectified return signal has a zero crossing from positive to negative and when the number of samples within said first time window has reached a preset value,
 (4) opening a second time window for monitoring of samples of said envelope, said discriminating step determining when at least one of a predetermined number of samples of the rectified return signal is greater than a decay threshold, and outputting a signal indicative of an intrusion event, and a predetermined number of samples of the rectified return signal is less than the decay threshold, and outputting a signal indicative of a non-intrusion event.

16. The method as set forth in claim 15, further including the step of enabling an alarm upon determination of an intrusion event.

17. The method as set forth in claim 15, further including the step of resetting said discriminating step upon determining an intrusion event and the occurrence of at least one of the on-time of an alarm indicative of an intrusion event is equal to a predetermined time, and the rectified return signal is less than a predetermined value.

18. The method as set forth in claim 15, further including the step of resetting said discriminating step upon determining a non-intrusion event and the occurrence of at least one of the rectified return signal is less than the set threshold, a current sample of the rectified return signal is equal to a preceding sample of the rectified return signal, a preset time has expired from the time the non-intrusion event is determined, a preset time has expired from the opening of the second time window, and the derivative of the rectified output signal is greater than the slope of the derivative of the rectified return output signal.

* * * * *